July 5, 1949.   M. J. HANSELMAN   2,475,319
COMBINATION GRATE HOLDER AND PAN
Filed July 26, 1947

INVENTOR.
MABEL J. HANSELMAN

Patented July 5, 1949

2,475,319

UNITED STATES PATENT OFFICE 2,475,319

COMBINATION GRATE HOLDER AND PAN

Mabel J. Hanselman, San Diego, Calif.

Application July 26, 1947, Serial No. 763,991

2 Claims. (Cl. 146—203)

My invention relates to a combination grate holder and pan, more particularly for use in grating various foods or the like, and the objects of my invention are:

First, to provide a combination grate holder and pan of this class which properly supports a grate at an incline to the horizontal and directly receives food or other material from the grate as it is grated.

Second, to provide a combination grate holder and pan of this class having slideways at opposite sides thereof in which a conventional grate may be conveniently removably mounted whereby material collected in the pan is readily exposed by removing the grate from the position thereabove.

Third, to provide a combination grate holder and pan of this class which affords considerable convenience to the housewife in the preparation of a large variety of foodstuffs or the like.

Fourth, to provide a combination grate holder and pan of this class which effectively prevents grated particles of various materials from becoming scattered over a large area below the grate.

Fifth, to provide a combination grate holder and pan of this class in which the grate holder may be made integral with the pan at opposite sides thereof whereby production of said grate holder and pan is greatly facilitated, and Sixth, to provide a combination grate holder and pan of this class which is very simple and economical of construction, efficient in operation and which will not readily deteriorate or get out of order.

Figure 1:
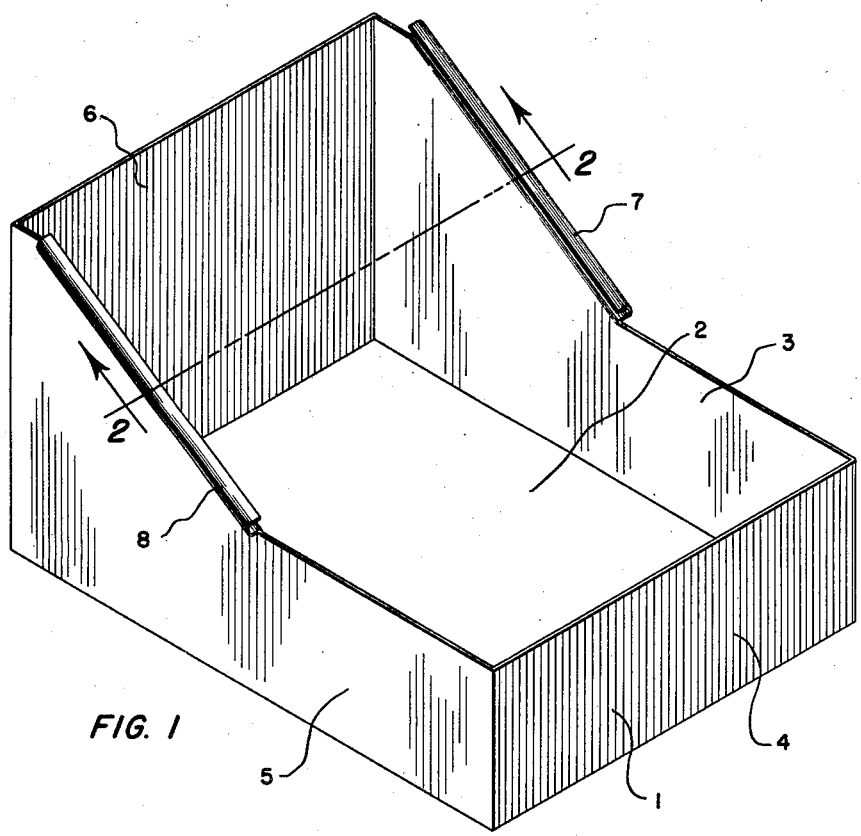
Figure 2:
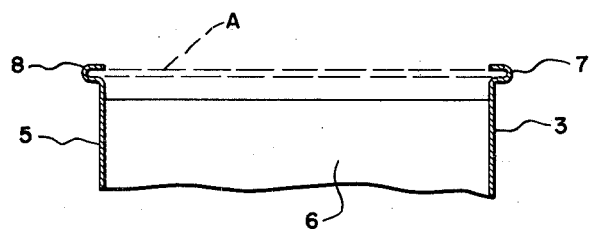

With these and other objects in view, as will appear hereinafter, my invention consists of certain novel features of construction, combination and arrangement of parts and portions as will be hereinafter described in detail and particularly set forth in the appended claims, reference being had to the accompanying drawing and to the characters of reference thereon forming a part of this application in which: Figure 1 is a perspective view of my combination grate holder and pan, and Figure 2 is a fragmentary sectional view thereof taken from the line 2—2 of Figure 1.

Similar characters of reference refer to similar parts and portions throughout the several views of the drawing.

The pan 1 is provided with an enclosed bottom portion 2 and substantially vertically extending side walls 3, 4, 5, and 6. The side walls 3 and 5 are each provided with upwardly inclined edge portions 7 and 8 respectively, which inclined edge portions 7 and 8 are folded into substantially U-shaped in cross section channel portions. These channel portions 7 and 8 are integral with the side portions 3 and 5, as shown in Figure 2 of the drawing, and are open at their upper and lower ends. The side wall 4 is relatively low compared to the side wall 6 which terminates at the upper ends of the inclined channel portions 7 and 8. Thus, the side walls 3, 4, 5, and 6 form a pan over a portion of which the channels 7 and 8 are adapted to support a conventional grate, as indicated by dash line A in Fig. 2 of the drawing. This grate A is preferably adapted for use in grating various food stuffs such as carrots, other vegetables, cheese and so forth. It will be noted that the channel portions 7 and 8 are in opposed relationship to each other, having their open sides facing each other in order to receive opposite ends of said grater A.

The operation of my combination grate holder and pan is substantially as follows: The pan 1 may be handled, washed, and stored in the open relationship as shown in Figure 1 of the drawing, and when used as a grate holder, the grate is positioned in the channel portions 7 and 8 as indicated by dash lines A in Figure 2 of the drawing whereby the grate is maintained in an inclined relationship to the horizontal bottom portion 2 of the pan 1. It will be noted that the side walls 3 and 5 terminate inwardly of the outwardly extending channel portions 7 and 8 whereby the edge portion of the grate projecting from the lower ends of the channel shaped portions 7 and 8 rest upon the upper edge of the side portions 3 and 5 preventing displacement of the grate during use. The grate operates in the conventional manner wherein articles are rubbed thereon and grated through the grate. The angular disposition of the grate in the channel shaped portions 7 and 8 provides for gravitational clearing at the upper side of the grate and convenient angle from which to operate the material on the grate. During the grating operations of various food stuffs the grated particles thereof fall from the lower side of the grate A into the pan 1 at its bottom portion 2, and some of the particles may roll on the decline of the grate from the upper surface thereof into the pan 1. When the grating operation is complete, the grate A may be easily and angularly slid from the channel portions 7 and 8 whereupon all of the grated contents in the pan 1 are uncovered and available for use. After the grating operation the pan 1 and the grate A may be washed separately, greatly facilitating the efficiency of washing operations thereon.

Though I have shown and described a particular construction, combination, and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A combination grate holder and pan of the class described, consisting of a pan having a flat bottom and upwardly extending side portions provided with opposed channel shaped portions at opposite sides extending only substantially one half the length of said upper edges thereof arranged in an inclined relationship to the bottom of the pan, and arranged to receive the conventional grate therein to cover up one half of said pan only, said channel shaped portions extending outwardly of the plane of the sides of said pan whereby the edge of a grate inserted between said channel shaped portions rests upon the upper edges of the pan at the lower ends of said channel shaped portions.

2. A combination grate holder and pan of the class described, consisting of a pan having a flat bottom and upwardly extending side portions provided with opposed channel shaped portions at opposite sides thereof arranged in an inclined relationship to the bottom of the pan, and arranged to receive the conventional grate therein to cover up one half of said pan only, said channel shaped portions extending outwardly of the plane of the sides of said pan whereby the edge of a grate inserted between said channel shaped portions rests upon the upper edges of the pan at the lower ends of said channel shaped portions, said channel shaped portions extending upwardly on an incline from substantially the middle portion of said pan toward one end thereof.

MABEL J. HANSELMAN.

REFERENCES CITED

The following references are of record in the file of this patent:

UNITED STATES PATENTS

| Number | Name | Date |
|---|---|---|
| 564,656 | Sobey | July 28, 1896 |
| 888,287 | Williams | May 19, 1908 |

FOREIGN PATENTS

| Number | Country | Date |
|---|---|---|
| 7,856 | Great Britain | Apr 3, 1913 |
| 177,515 | Switzerland | Aug. 16, 1935 |
| 214,871 | Switzerland | Aug. 16, 1941 |